United States Patent
Anson et al.

(10) Patent No.: US 9,723,012 B2
(45) Date of Patent: *Aug. 1, 2017

(54) SYSTEMS AND METHODS FOR SECURITY TIERING IN PEER-TO-PEER NETWORKING

(71) Applicant: Dell Products L.P., Round Rock, TX (US)

(72) Inventors: Douglas M. Anson, Dripping Springs, TX (US); Carlton A. Andrews, Austin, TX (US); Charles D. Robison, Round Rock, TX (US); David Konetski, Austin, TX (US); Frank H. Molsberry, Georgetown, TX (US); Yuan-Chang Lo, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/607,369

(22) Filed: Jan. 28, 2015

(65) Prior Publication Data

US 2015/0143465 A1   May 21, 2015

Related U.S. Application Data

(63) Continuation of application No. 13/747,030, filed on Jan. 22, 2013, now Pat. No. 8,978,101.

(51) Int. Cl.
*H04L 29/06* (2006.01)
*H04L 29/08* (2006.01)

(52) U.S. Cl.
CPC .......... *H04L 63/105* (2013.01); *H04L 63/126* (2013.01); *H04L 63/20* (2013.01); *H04L 67/104* (2013.01)

(58) Field of Classification Search
CPC ..... H04L 63/105; H04L 63/20; H04L 63/126; H04L 67/104; H04L 67/34; H04L 63/1408; H04L 63/10; H04L 63/00; H04L 41/12; H04L 61/2015; H04L 61/103; H04L 63/0876; H04L 63/102; H04L 63/08;

(Continued)

(56) References Cited

U.S. PATENT DOCUMENTS

| | | |
|---|---|---|
| 7,392,375 B2 | 6/2008 | Bartram et al. |
| 7,949,750 B2 | 5/2011 | Lee et al. |

(Continued)

OTHER PUBLICATIONS

Ohicic, Dejan S. et al., Peer-to-Peer Computing, 2003, http://www.cs.kau.se/cs/education/courses/dvad02/p2/seminar4/Papers/HPL-2002-57R1.pdf, pp. 1-51.

*Primary Examiner* — Saleh Najjar
*Assistant Examiner* — Shu Chun Gao
(74) *Attorney, Agent, or Firm* — Jackson Walker L.L.P.

(57) ABSTRACT

A method may also include receiving from each of one or more of potential peer information handling systems a connection request comprising a peer minimum acceptable security level for the peer information handling system. The method may additionally include comparing the peer minimum acceptable security level to a security level of the information handling system. The method may further include completing a peer-to-peer connection between the information handling system and the peer information handling system if the minimum acceptable security level is not higher than that of the security level of the information handling system.

17 Claims, 2 Drawing Sheets

(58) Field of Classification Search
CPC .............. G06Q 20/04; G06Q 20/3823; G06Q 20/3829; G06Q 20/405; G06Q 20/4016; G06Q 30/06; G06Q 20/4014; G06F 21/31
See application file for complete search history.

(56) References Cited

U.S. PATENT DOCUMENTS

| | | | |
|---|---|---|---|
| 2002/0188657 A1 | 12/2002 | Traversat et al. | |
| 2003/0177372 A1* | 9/2003 | Orlando | G08B 25/008 713/189 |
| 2006/0005020 A1* | 1/2006 | Hardt | H04L 63/1416 713/166 |
| 2006/0005263 A1* | 1/2006 | Hardt | G06F 21/33 726/28 |
| 2007/0207729 A1* | 9/2007 | Chen | G06F 17/3056 455/15 |
| 2009/0144836 A1* | 6/2009 | Gutta | G06F 21/10 726/30 |
| 2009/0172799 A1* | 7/2009 | Morgan | G06F 11/2023 726/11 |
| 2013/0061035 A1* | 3/2013 | Hook | H04L 9/088 713/150 |
| 2013/0275574 A1* | 10/2013 | Hugard, IV | H04L 63/10 709/224 |
| 2014/0011471 A1* | 1/2014 | Khosla | H04W 4/02 455/404.2 |
| 2014/0053226 A1* | 2/2014 | Fadida | H04L 67/34 726/1 |
| 2014/0187200 A1* | 7/2014 | Reitter | H04W 4/021 455/410 |
| 2015/0143465 A1* | 5/2015 | Anson | H04L 63/105 726/3 |

* cited by examiner

SYSTEMS AND METHODS FOR SECURITY TIERING IN PEER-TO-PEER NETWORKING

The present patent application is a continuation of a previously filed patent application, U.S. patent application Ser. No. 13/747,030, filed Jan. 22, 2013, the entirety of which is hereby incorporated by reference.

TECHNICAL FIELD

The present disclosure relates in general to information handling systems, and more particularly to peer-to-peer networking between information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may often be coupled to one another via peer-to-peer networking. A peer-to-peer (often abbreviated to "P2P") network is one in which each information handling system in the network can act as a client or server for the other information handling systems in the network, allowing shared access to various resources such as files, peripherals, and sensors without the need for a central server. Peer-to-peer networks can be set up within the home, a business, or over the Internet.

Of particular concern in peer-to-peer networks is security, in order to guard a particular information handling system from unwanted attacks from other information handling systems. Most traditional peer-to-peer networks employ a simple security mechanism to help guard the network from unwanted attacks or usage. In such approaches, peers attempt to connect to one another, pass a simple security check, then either proceed with data transfer or disconnect depending on the security check. In larger peer-to-peer environments, this simple security mechanism is insufficient, typically because not all potential peers can be thought of as being at the same level of trust.

SUMMARY

In accordance with the teachings of the present disclosure, the disadvantages and problems associated with peer-to-peer networking between information handling systems have been reduced or eliminated.

In accordance with embodiments of the present disclosure, an information handling system may include a processor and a memory communicatively coupled to the processor having stored thereon a peer-to-peer agent comprising one or more instructions. The instructions may the processor to, when read and executed by the processor: (i) determine, based on published messages from one or more of other information handling systems indicative of availability of the one or more other information handling systems for peer-to-peer networking, one or more potential peer information handling systems of the other information handling systems to which the information handling system may potentially couple for peer-to-peer networking; (ii) receive from each of one or more of the potential peer information handling systems a connection request comprising a peer minimum acceptable security level for the peer information handling system; (iii) compare the peer minimum acceptable security level to a security level of the information handling system; and (iv) complete a peer-to-peer connection between the information handling system and the peer information handling system if the minimum acceptable security level is not higher than that of the security level of the information handling system.

In accordance with these and other embodiments of the present disclosure, a method may include determining, at an information handling system based on published messages from one or more of other information handling systems remotely coupled to the information handling system and indicative of availability of the one or more other information handling systems for peer-to-peer networking, one or more potential peer information handling systems of the other information handling systems to which the information handling system may potentially couple for peer-to-peer networking. The method may also include receiving from each of one or more of the potential peer information handling systems a connection request comprising a peer minimum acceptable security level for the peer information handling system. The method may also include comparing the peer minimum acceptable security level to a security level of the information handling system. The method may further include completing a peer-to-peer connection between the information handling system and the peer information handling system if the minimum acceptable security level is not higher than that of the security level of the information handling system.

Technical advantages of the present disclosure will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
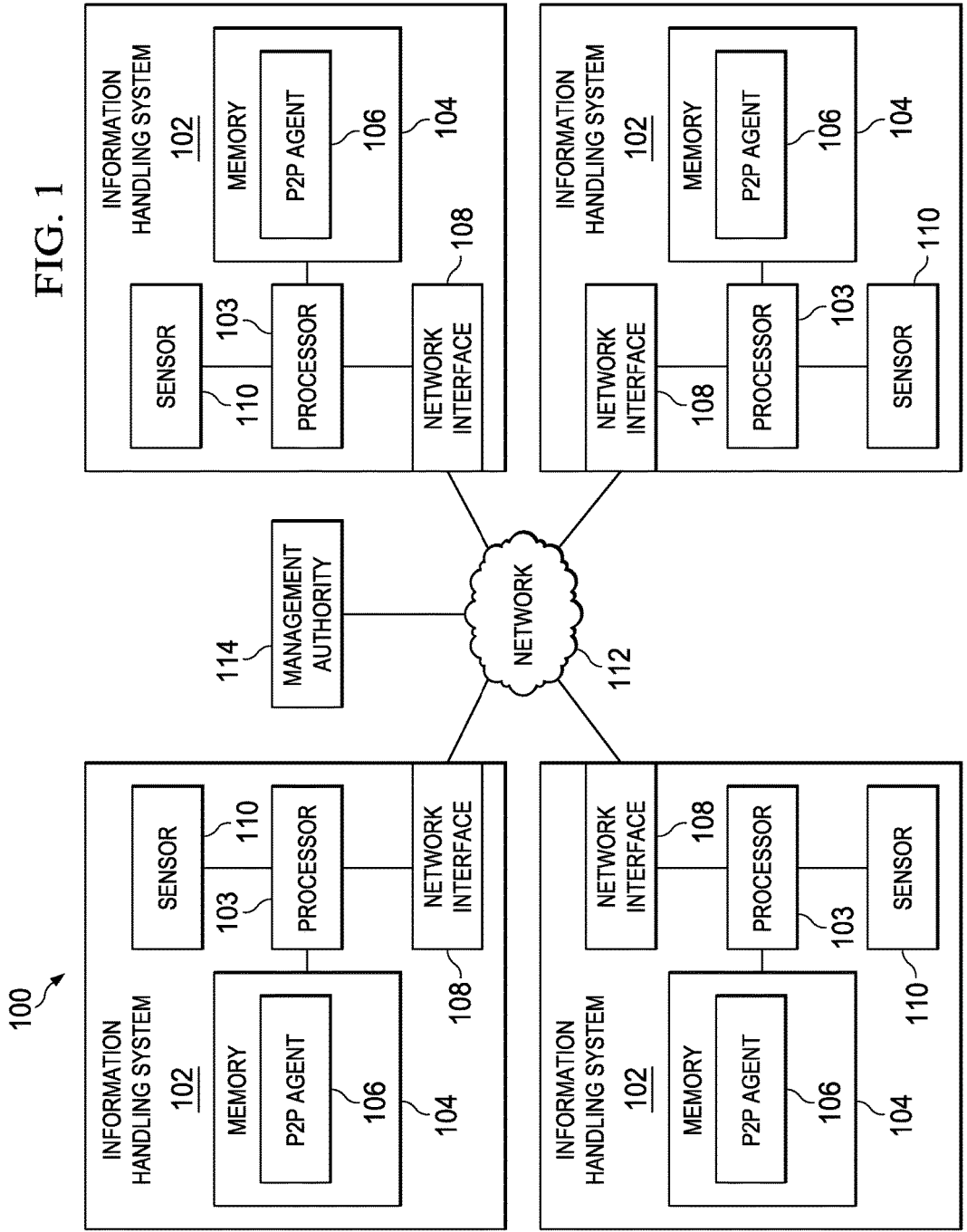
FIG. 1 illustrates a block diagram of an example peer-to-peer network, in accordance with certain embodiments of the present disclosure.
Figure 2:
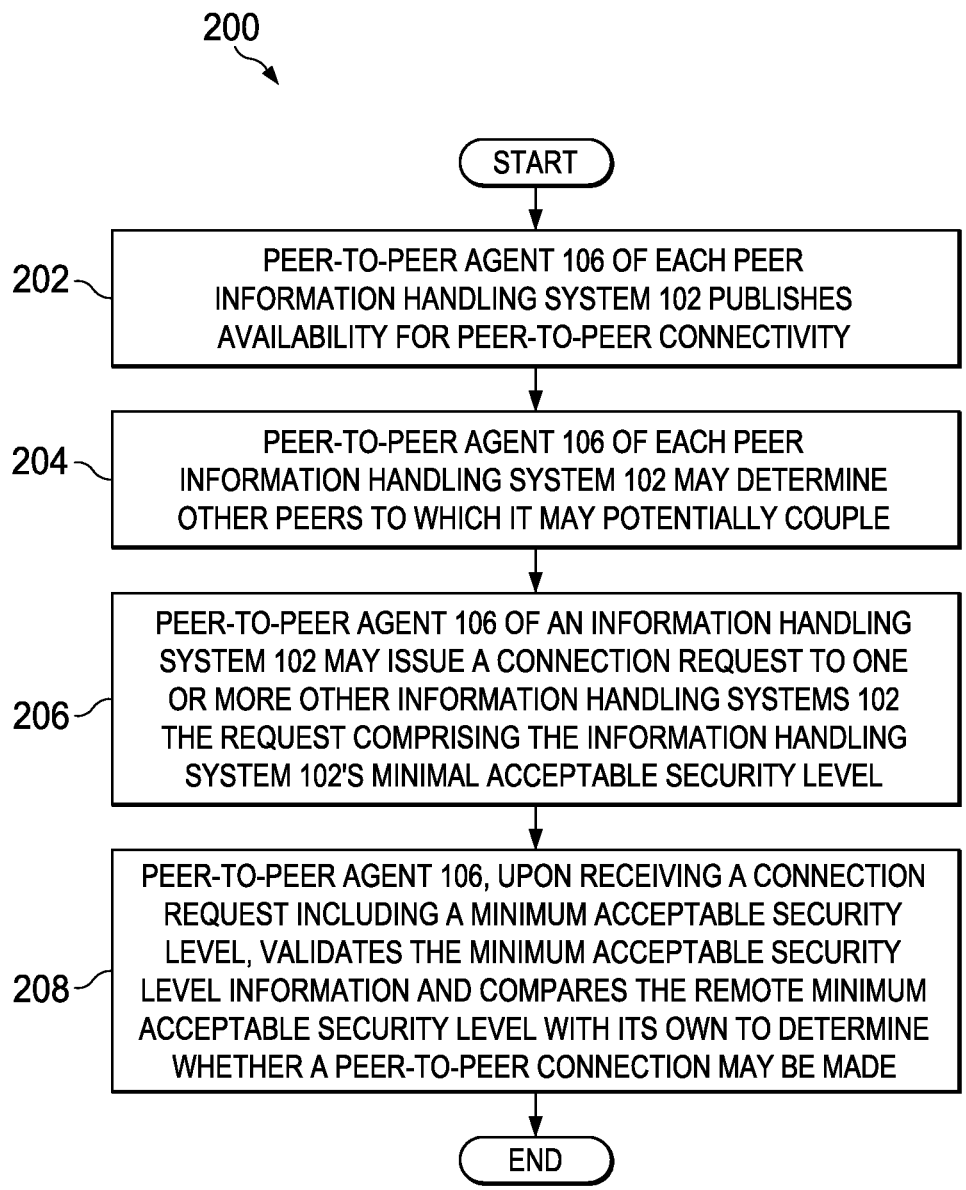
FIG. 2 illustrates a flow chart of an example method for peer-to-peer connectivity, in accordance with certain embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more busses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, busses, memories, I/O devices and/or interfaces, storage resources, network interfaces, motherboards, and/or any other components and/or elements of an information handling system.

The terms "wireless transmissions" and "wireless communication" may be used to refer to all types of electromagnetic communications which do not require a wire, cable, or other types of conduits. Examples of wireless transmissions which may be used include, but are not limited to, short-range wireless communication technologies (e.g., proximity card, Radio-Frequency Identification (RFID), Near Field Communication (NFC), BLUETOOTH, ISO 14443, ISO 15693, or other suitable standard), personal area networks (PAN) (e.g., BLUETOOTH), local area networks (LAN), wide area networks (WAN), narrowband personal communications services (PCS), broadband PCS, circuit switched cellular, cellular digital packet data (CDPD), radio frequencies, such as the 800 MHz, 900 MHz, 1.9 GHz and 2.4 GHz bands, infra-red and laser.

The term "wire-line transmissions" may be used to refer to all types of electromagnetic communications over wires, cables, or other types of conduits. Examples of such conduits include, but are not limited to, metal wires and cables made of copper or aluminum, fiber-optic lines, and cables constructed of other metals or composite materials satisfactory for carrying electromagnetic signals. Wire-line transmissions may be conducted in accordance with teachings of the present disclosure over electrical power lines, electrical power distribution systems, building electrical wiring, conventional telephone lines, Ethernet cabling (10 baseT, 100 baseT, etc.), coaxial cables, T-1 lines, T-3 lines, ISDN lines, ADSL, etc.

FIG. 1 illustrates a block diagram of an example peer-to-peer network 100, in accordance with embodiments of the present disclosure. As shown in FIG. 1, peer-to-peer network 100 may include a plurality of information handling systems 102, a network 112, and a management authority 114.

An information handling system 102 may be any suitable information handling system, including a personal computer (e.g., a desktop computer, a laptop, notebook, tablet, handheld, smart phone, personal digital assistant, etc.). As depicted in FIG. 1, an information handling system 102 may include a processor 103, a memory 104 communicatively coupled to processor 103, a network interface 108 communicatively coupled to processor 103, and one or more sensors 110 communicatively coupled to processor 103.

A processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in an associated memory 104 and/or another component of an information handling system 102.

A memory 104 may be communicatively coupled to an associated processor 103 and may include any system, device, or apparatus configured to retain program instructions and/or data for a period of time (e.g., computer-readable media). A memory 104 may include RAM, EEPROM, a PCMCIA card, flash memory, magnetic storage, opto-magnetic storage, or any suitable selection and/or array of volatile or non-volatile memory that retains data after power to its associated information handling system 102 is turned off.

As shown in FIG. 1, memory 104 may have peer-to-peer agent 106 stored thereon. Peer-to-peer agent 106 may include any system, device, or apparatus configured to facilitate exchange of security policy information and manage connections to peer information handling systems, as is described in greater detail elsewhere in this disclosure. In some embodiments, peer-to-peer agent 106 may be implemented as a program of instructions that may be read by and executed on processor 103 to carry out the functionality of peer-to-peer agent 106. In some embodiments, peer-to-peer agent 106 may be configured to perform method 200, described below.

A network interface 108 may comprise any suitable system, apparatus, or device operable to serve as an interface between an information handling system 102 and another information handling system 102 and/or network 112. A network interface 108 may enable an information handling system 102 to communicate using any suitable transmission protocol and/or standard. In some embodiments, a network interface 108 may be configured to communicate with network interfaces 108 of other information handling systems 102 via network 112. In these and other embodiments, a network interface 108 may be configured to communicate with one or more network interfaces 108 of other information handling systems directly, without network 112 interfaced in between. A network interface 108 may be configured to communicate between a network 112 and/or another network interface 108 via wireless transmissions and/or wire-line transmissions. In these and other embodiments, network interface 108 may comprise a network interface card, or "NIC." In addition, network interface 108 may enable user information handling system 102 to communicate over network 112 or directly with another network interface 108 using any suitable transmission protocol and/or standard, including without limitation all transmission protocols and/or standards enumerated below with respect to the discussion of network 112.

Sensors 110 may include one or more systems, apparatuses, and/or devices, each for measuring a physical quantity and converting it into a signal which can be read by processor 103. Sensors 110 may include any suitable sensors, including without limitation, an accelerometer (e.g., for measuring acceleration), gyroscope (e.g., for measuring orientation), thermometer (e.g., for measuring temperature), odometer (e.g., for measuring velocity), Global Positioning System device (e.g., for measuring location), etc.

In addition to a processor 103, a memory 104, a network interface 108, and sensors 110, an information handling system 102 may include one or more other information handling resources.

Network 112 may be a network and/or fabric configured to couple user information handling systems 102 to each other. In some embodiments, network 112 may include a communication infrastructure, which provides physical connections, and a management layer, which organizes the physical connections and information handling systems communicatively coupled to network 112. Network 112 may be implemented as, or may be a part of, a storage area network (SAN), a PAN, a LAN, a metropolitan area network (MAN), a WAN, a wireless local area network (WLAN), a virtual private network (VPN), an intranet, the Internet or any other appropriate architecture or system that facilitates the communication of signals, data and/or messages (generally referred to as data). Network 112 may transmit data using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 112 and its various components may be implemented using hardware, software, or any combination thereof.

Management authority 114 may include an information handling system coupled to network 112 and configured to generate, validate, and manage security values for one or more information handling systems 102. For example, management authority may 114, via network 112, couple to an information handling system 102 and analyze the information handling system to determine a security level. Based on such analysis, management authority 114 may generate a value indicative of the security level (e.g., a number, word, or phrase describing a level of security). Management authority 114 may also generate a file including the security level, digitally sign such file, and communicate the file to the relevant information handling system 102. Such security level value may be based on any number of factors, including without limitation, software and/or data stored on a memory 104 or other computer-readable medium associated with information handling system 102 (e.g., operating system version number, firmware version numbers) model number or unique identifier (e.g., serial number, Media Access Control address, Internet Protocol Address) of any information handling resource of an information handling system 102, data communicated from sensors 110 (e.g., an odometer may indicate that an information handling system 102 is moving, and such movement may indicate that an information handling system is less secure; Global Positioning System data may indicate that an information handling system is in a location that is less secure, etc.) and/or any other parameter or variable associated with an operating system (e.g., user logged into information handling system 102, time of day, day of week, etc.). In addition or alternatively, such security level value may be based on information representing a current operational state of the information handling system (e.g., whether operating system is execution), information representing a current orientation of the information handling system (e.g., based on sensor-derived velocity, sensor-derived acceleration, sensor-derived atmospheric conditions such as barometric pressure, sensor-derived orientation).

In operation, peer-to-peer agent 106 of each information handling system 102 may be configured to publish to other information handling systems 102 its availability for connectivity, publish to other information handling systems the minimum acceptable security value for another information handling system 102 to which it will connect for peer-to-peer networking, and/or publish to other information handling systems 102 its own security value.

FIG. 2 illustrates a flow chart of an example method 200 for peer-to-peer connectivity, in accordance with certain embodiments of the present disclosure. According to one embodiment, method 200 may begin at step 202. As noted above, teachings of the present disclosure may be implemented in a variety of configurations of peer-to-peer network 100. As such, the preferred initialization point for method 200 and the order of the steps comprising method 200 may depend on the implementation chosen.

At step 202, peer-to-peer agent 106 of each peer information handling system 102 may publish to other information handling systems 102 its availability for peer-to-peer connectivity. In some embodiments, such availability information may also include the security level value for each peer information handling system 102.

At step 204, based on the published availability information, peer-to-peer agent 106 of each peer information handling system 102 may determine other peers to which it may potentially couple. In some embodiments, the determined identify of potential peers for an information handling system 102 may include only those potential peers having a security level value satisfying the minimum acceptable security level of the information handling system 102.

At step 206, peer-to-peer agent 106 of an information handling system 102 may issue a connection request to one or more other information handling systems 102. During the connection request, peer-to-peer agents 106 of the information handling systems 102 may exchange messages comprising the information handling system 102's minimal acceptable security level. The minimum acceptable security level for each information handling system 102 may be based on user and/or administrator preferences, or may be based on any number of factors, including without limitation, software and/or data stored on a memory 104 or other computer-readable medium associated with information handling system 102 (e.g., operating system version number, firmware version numbers) model number or unique identifier (e.g., serial number, Media Access Control address, Internet Protocol Address) of any information handling resource of an information handling system 102, data communicated from sensors 110 (e.g., an odometer may indicate that an information handling system 102 is moving, and such movement may indicate that an information handling system requires more secure connections; Global Positioning System data may indicate that an information handling system is in a location that requires more security, etc.) and/or any other parameter or variable associated with an operating system (e.g., user logged into information handling system 102, time of day, day of week, etc.). In addition or alternatively, such security level value may be based on information representing a current operational state of the information handling system (e.g., whether operating system is execution), information representing a current orientation of the information handling system (e.g., based on sensor-derived velocity, sensor-derived acceleration, sensor-derived atmospheric conditions such as barometric pressure, sensor-derived orientation). In these and other embodiments, such a connection request may be in the form of an eXtensible Markup Language (XML) packet that is signed and validated by management authority 114, such that when it is received by another information handling system 102, it may be verified by the peer-to-peer agent 106 of such receiving information handling system 102.

At step 208, a peer-to-peer agent 106, upon receiving a connection request including a minimum acceptable security level, may validate (e.g., validate the digital signature of) the minimum acceptable security level information and compare the remote minimum acceptable security level with its own. If the peer's minimum acceptable security is equal to or below the information handling system 102's security level, a peer-to-peer connection may be made, otherwise connection may be terminated. After completion of step 208, method 200 may end.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using peer-to-peer network 100 or any other system operable to implement method 200. In certain embodiments, method 200 may be implemented partially or fully in software and/or firmware embodied in computer-readable media.

Although the present disclosure has been described in detail, it should be understood that various changes, substitutions, and alterations can be made hereto without departing from the spirit and the scope of the disclosure as defined by the appended claims.

What is claimed is:

1. An information handling system comprising:
   a processor;
   a memory communicatively coupled to the processor having stored thereon a peer-to-peer agent comprising one or more instructions, the instructions for causing the processor to, when read and executed by the processor:
   receive from a management authority a digitally signed file indicating a security level determined by the management authority in accordance with an analysis of the information handling system;
   receive from each of one or more potential peer information handling systems a connection request comprising a peer minimum acceptable security level for the peer information handling system;
   compare the peer minimum acceptable security level to the security level of the information handling system; and
   complete a peer-to-peer connection between the information handling system and the peer information handling system if the peer minimum acceptable security level is equal to that or below that of the security level of the information handling system;
   wherein the security level is based, at least in part, on a particular parameter associated with the information handling system and wherein the particular parameter comprises a current location parameter indicative of a current location of the information handling system.

2. The information handling system of claim 1, wherein the peer minimum acceptable security level is validated by the management authority common to the information handling system and the peer information handling system.

3. The information handling system of claim 2, wherein receiving the connection request comprises verifying a digital signature to the peer minimum acceptable security applied by the management authority.

4. The information handling system of claim 1, the peer-to-peer agent configured to publish, to other information handling systems communicatively coupled to the information handling system, availability of the information handling system for peer-to-peer networking.

5. The information handling system of claim 1, the peer-to-peer agent configured to issue, to one or more of the potential peer information handling systems, a connection request comprising a minimum acceptable security level for the information handling system.

6. The information handling system of claim 1, wherein the security level is based, at least in part, on an atmospheric parameter indicated by a sensor, wherein the atmospheric parameter is selected from: a barometric pressure parameter and a directional orientation parameter.

7. The information handling system of claim 1, wherein the at least one parameter comprises at least one of:
   a version number of an operating system stored on a non-transitory computer-readable medium associated with the potential peer information handling system; and
   a version number of an operating system stored on a non-transitory computer-readable medium associated with the potential peer information handling system.

8. A method for managing security settings of a managed information handling system, the method comprising:
   coupling to the managed information handling system;
   determining a security level for the managed information handling system based on at least one security parameter;
   digitally sign a file indicating the security level;
   communicating the file to the managed information handling system to set a security level of the managed information handling system, wherein the managed information handling system is configured for performing operations comprising;
   receiving from each of one or more potential peer information handling systems a connection request comprising a peer minimum acceptable security level for the peer information handling system;
   comparing the peer minimum acceptable security level to the security level of the managed information handling system indicated by the file; and
   completing a peer-to-peer connection between the managed information handling system and the peer information handling system if the peer minimum acceptable security level is equal to that or below that of the security level of the managed information handling system wherein the security level is based, at least in part, on a particular security parameter associated with the information handling system and wherein the particular security parameter comprises an atmospheric parameter indicative of a current atmospheric condition.

9. The method of claim 8, validating the peer minimum acceptable security level.

10. The method of claim 9, wherein receiving the connection request comprises verifying a digital signature to the peer minimum acceptable security indicated in the file.

11. The method of claim 8, wherein the managed information handling system is configured to publish, to the one or more other information handling systems, availability of the managed information handling system for peer-to-peer networking.

12. The method of claim 8, wherein the managed information handling system is configured to issue, to one or more of the potential peer information handling systems, a connection request comprising a minimum acceptable security level for the managed information handling system.

13. The method of claim 8, wherein determining the security level comprises determining the security level based on at least sensor data received from one or more sensors of the managed information handling system.

14. The method of claim 13, wherein determining the security level comprises determining the security level in accordance with sensor data indicating movement of the managed information handling system in accordance with sensor information communicated from one or more sensors of the managed information handling system.

15. The method of claim 14, wherein the atmospheric parameter is selected from: a barometric pressure parameter indicative of a current barometric pressure and a directional orientation parameter indicative of a current directional orientation.

16. The method of claim 14, wherein determining the security level comprises determining the security level in accordance with location information indicated by a Global Positioning System of the managed information handling system.

17. The method of claim 13, wherein determining the security level comprises determining the security level in accordance with at least one of:

a version number of an operating system of the management information handling system; and a version number of managed information handling system firmware.

* * * * *

UNITED STATES PATENT AND TRADEMARK OFFICE
CERTIFICATE OF CORRECTION

PATENT NO. : 9,723,012 B2
APPLICATION NO. : 14/607369
DATED : August 1, 2017
INVENTOR(S) : Anson et al.

It is certified that error appears in the above-identified patent and that said Letters Patent is hereby corrected as shown below:

In the Claims

Column 8 please amend Claim 8 as follows:
8. A method for managing security settings of a managed information handling system, the method comprising:
    coupling to the managed information handling system;
    determining a security level for the managed information handling system based on at least one security parameter;
    digitally signing a file indicating the security level;
    communicating the file to the managed information handling system to set a security level of the managed information handling system, wherein the managed information handling system is configured for performing operations comprising:
    receiving from each of one or more potential peer information handling systems a connection request comprising a peer minimum acceptable security level for the peer information handling system;
    comparing the peer minimum acceptable security level to the security level of the managed information handling system indicated by the file; and
    completing a peer-to-peer connection between the managed information handling system and the peer information handling system if the peer minimum acceptable security level is equal to that or below that of the security level of the managed information handling system;
    wherein the security level is based, at least in part, on a particular security parameter associated with the information handling system and wherein the particular security parameter comprises an atmospheric parameter indicative of a current atmospheric condition.

Column 9 please amend Claim 9 as follows:
9. The method of Claim 8, further comprising validating the peer minimum acceptable security level.

Signed and Sealed this
Third Day of October, 2017

Joseph Matal
*Performing the Functions and Duties of the*
*Under Secretary of Commerce for Intellectual Property and*
*Director of the United States Patent and Trademark Office*